United States Patent [19]

Morioka

[11] Patent Number: 5,135,983
[45] Date of Patent: Aug. 4, 1992

[54] COMPOSITION CONTAINING A POLYPHENYLENE ETHER RESIN AND POLYAMIDE

[75] Inventor: Masataka Morioka, Moka, Japan

[73] Assignee: GE Plastics Japan, Ltd., Tokyo, Japan

[21] Appl. No.: 450,097

[22] Filed: Dec. 13, 1989

[30] Foreign Application Priority Data

Dec. 13, 1988 [JP] Japan .................................. 63-312823

[51] Int. Cl.$^5$ ...................... C08L 53/02; C08L 71/12; C08L 77/06
[52] U.S. Cl. ........................................ 525/92; 524/502; 524/505; 524/508; 524/514; 525/132; 525/152; 525/397; 525/905
[58] Field of Search ................ 525/397, 905, 92, 132, 525/152

[56] References Cited

U.S. PATENT DOCUMENTS 4,957,966  9/1990  Nishio et al. ..................... 525/397

Primary Examiner—Jacob Ziegler
Attorney, Agent, or Firm—Francis T. Coppa

[57] ABSTRACT

This invention relates to compositions which contain polyphenylene ether resin and polyamide resin, wherein a portion of the polyphenylene ether is modified by terminal oxazolinization.

12 Claims, No Drawings

COMPOSITION CONTAINING A POLYPHENYLENE ETHER RESIN AND POLYAMIDE

SUMMARY OF THE INVENTION

Detailed explanation of the invention

The present invention concerns a resin composition which contains polyphenylene ether, oxazolinyl group-containing polyphenylene ether, and polyamide.

Although polyphenylene ether has various excellent properties (e.g., high heat resistance as well as excellent strength, electrical properties, and dimensional precision), said resin is easily degraded by aromatic hydrocarbons (e.g., benzene, etc.) or halogenated hydrocarbons (e.g., Triclene, etc.). Since the molding efficiency is inferior, furthermore, said resin is seldom used as a single molded product.

To improve the molding efficiency of polyphenylene ether, attempts have been made to mix it with a polystyrene resin. If this method is implemented, the molding efficiency is improved, but since the polystyrene resin is also degraded by aromatic hydrocarbons (e.g., benzene, etc.) or halogenated hydrocarbons (e.g., Triclene, etc.), it is impossible to improve the solvent resistance by adding said polystyrene resin.

Attempts have also been made to add a thermoplastic polyamide resin to simultaneously improve the molding efficiency and solvent resistance. Since the miscibility between the polyphenylene ether and thermoplastic polyamide is inferior, however, the mechanical strength of a molded product derived from the resulting mixture is inevitably inferior.

Attempts have also been made to enhance the dispersibility between the polyphenylene ether and polyamide by adding a polymer obtained by reacting an epoxy group-containing polyphenylene ether with a polyester (see Japanese Kokoku Patent No. Sho 63[1988]-125568).

Problems to be solved by the invention

The foremost objective of the present invention is to provide a resin composition, which contains a polyphenylene ether and polyamide and which yields a molded product characterized by excellent mechanical strength (especially the impact resistance) as well as superb solvent resistance.

Mechanism for solving the problems

The present inventors have discovered that the mechanical strength of said molded product can be significantly improved by at least partially introducing an oxazolinyl group to a polyphenylene ether resin.

Mechanism for solving the problems

Briefly, the present invention concerns a resin with the following characteristics: in a resin composition which contains 5–90 wt% of a polyphenylene ether resin and 95–10 wt% of a polyamide resin, at least 1 wt% of said polyphenylene ether resin is modified by terminal oxazolinization.

As polyphenylene ether resin (which is not terminaloxazolinized) of the present invention, conventionally-known resins can be used. For example, homopolymers or copolymers obtained by oxidizing and polymerizing one or more monocyclic phenol compounds represented by the following general formula:

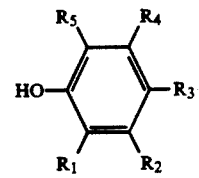

(in which $R_1$ through $R_5$ are selected among a hydrogen atom, halogenated hydrocarbon groups, hydrocarbon groups, and substituted hydrocarbon groups) can be appropriately used.

Concrete examples of such polymers include poly (2,6-dimethyl-1,4-phenylene) ether, poly (2,6-diethyl-1,4-phenylene) ether, poly(2-methyl-6-ethyl-1,4-phenylene) ether, poly (2-methyl-6-propyl-1,4-phenylene) ether, poly (2,6-dipropyl-1,4-phenylene) ether, poly(2-ethyl-6-propyl-1,4-phenylene) ether, etc. An especially desirable polyphenylene ether resin is poly (2,6-dimethyl-1,4-phenylene) ether. As a polyphenylene ether copolymer, a copolymer in which the aforementioned polyphenylene ether repetition unit is partially substituted with an alkyltrisubstituted phenol (e.g., 2,3,6-trimethylphenol, etc.) can be used. It is also possible to use a copolymer in which a styrene compound is grafted with said polyphenylene ether. As such a styrene-grafted polyphenylene ether, a copolymer obtained by graft-polymerizing a styrene compound (e.g., styrene, α-methylstyrene, vinyltoluene, chlorostyrene, etc.) with the aforementioned polyphenylene ether can be appropriately used.

The specific viscosity of the polyphenylene ether of the present invention (which is measured in a chloroform solvent at 30° C.) should be 0.15–0.65 dL/g, preferably 0.30–0.60 dL/g. If the specific viscosity is lower than 0.15, the resulting composition is inevitably brittle, and the mechanical strength is low. If the specific viscosity exceeds 0.65, on the other hand, the viscosity difference of the polyphenylene ether and the thermoplastic polyamide resin is excessively large. Thus, it is difficult to attain a satisfactory dispersibility and to attain the objectives of the present invention.

As the polyamide of the present invention, arbitrary conventionally-known polyamides can be used. Concrete examples include polycaproamide (nylon 6), polyhexamethyleneadipamide (nylon 6,6), polyhexamethylenesebacamide (nylon 6,10), polyhexamethylenedodecamide (nylon 6,12), polyundecanamide (nylon 11), polydodecanamide (nylon 12), and copolymerized or condensed polyamides consisting principally of the aforementioned compounds.

The relative viscosity of said polyamide, which is measured in a 98% sulfuric acid solution according to the procedures specified in JIS K-6810, should be 1.5–6.5, more preferably 1.8–6.0, or most preferably 2.0–5.5. If the relative viscosity is lower than 1.5, the resulting composition is inevitably brittle, and the mechanical strength is also inferior. If the relative viscosity exceeds 6.5, the melt viscosity of the polyamide is excessively high, and it is impossible to attain a satisfactory dispersibility after mixing.

The terminal-oxazolinized polyphenylene ether resin of the present invention is obtained by introducing an oxazolinyl group (which may or may not be substituted)

to the terminal of polyphenylene ether. The oxazolinyl group may be bonded with polyphenylene ether via an appropriate linking group (e.g., phosphate bond, etc.). For example, if an oxazolinyl group-containing compound represented by the following formula I:

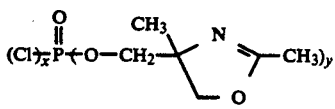

(in which x is 1 or 2; the sum of x and y is 3) is thermally reacted with polyphenylene ether in a solvent, a terminaloxazolinized modified polyphenylene ether represented by the following formula II is obtained:

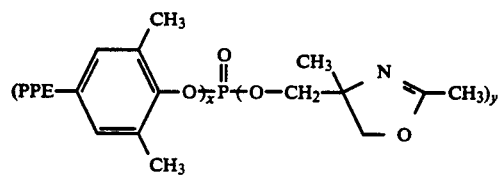

(in which PPE signifies the polyphenylene ether principal chain; x and y are defined as in formula I).

The terminal-modified polyphenylene ether can be precipitated in methanol or acetone for purifying purposes. If necessary, said precipitate is filtered and dried.

The aforementioned compound represented by formula I, which is used in said terminal-oxazolinizing process, can be manufactured by reacting phosphorus oxychloride, which is represented by the following formula III, with a compound represented by the following formula IV:

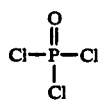

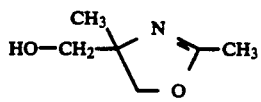

In said formula IV, ethylene and propylene groups may be used instead of the methylene group.

It should be noted that the aforementioned compounds does not constitute an exhaustive list of compounds that can be used for terminal-oxazolinizing purposes in the present invention. As a general rule, compounds which contain halogenated groups of phosphorus atoms and an oxazolinyl group within a single molecule, and compounds which contain halogenated acyl atom groups and an oxazolinyl group within a single molecule can be appropriately used.

As far as the present invention is concerned, the relative quantities of the polyphenylene ether resin and the polyamide resin should be 5–90 wt% and 95–10 wt%, respectively, preferably 20–80 wt% and 80–20 wt%, respectively. If the quantity of the polyphenylene ether resin is smaller than said range, the heat resistance is inferior. If the quantity of the polyamide resin is smaller than 5–90 wt%, the solvent resistance deteriorates. As far as the present invention is concerned, furthermore, at least 1 wt%, preferably at least 5 wt%, of the polyphenylene ether resin must be terminal-oxazolinized. The terminal oxazolinyl group enhances the dispersibility between the polyphenylene ether resin and polyamide in a process where the resin composition is thermally melted and molded. Thus, the impact resistance is presumably improved.

The resin composition of the present invention may also contain various conventionally-known components. For example, styrene resins and styrenic elastomeric copolymers, which are miscible with polyphenylene ether (e.g., styrene/ethylenepropylene copolymer, styrene/ethylene-butylene copolymer, styrene/butadiene copolymer, etc.) as well as other elastomers that are miscible with polyamide may be safely added. It is also possible to add conventionally-known fillers, flame retardants, etc.

In the paragraphs to follow, the contents of the present invention will be explained in further detail with reference to application examples.

Application examples

Poly(2,6-dimethyl-1,4-phenylene) ether (specific viscosity: 0.46 dL/g in chloroform at 30° C.) was used as polyphenylene ether in subsequent application examples.

A terminal-oxazolinizing treatment was carried out by reacting 100 parts by weight of the aforementioned polyphenylene ether with 3 parts by weight of the compound represented by formula I (mixture of compounds in which x values are 1 and 2) in toluene. In the aforementioned process, 6 parts by weight of dimethyl-n-butylamine was used as an acid receiver (i.e., an "acid Scavenger").

A nylon 6 with a molecular weight of approximately 13,000 were used as a polyamide.

In some of the examples, SEBS (KG 1651, manufactured by Shell Chemical Co.) was used as a styrene elastomer.

A resin composition characterized by one of the compositions shown in the table below (parts by weight) was prepared. After the individual components shown in the table had been sufficiently dispersed and mixed in a Henschel mixer, the resulting mixture was melt-mixed in a 50-mm biaxial screw extruder at a cylinder temperature of approximately 280° C. Thus, a pellet was obtained. The resulting pellet was injection-molded under the following conditions. Thus, a physical property measurement test piece was obtained:

cylinder temperature: 260° C.
injection pressure: 700 kg/cm$^2$
mold temperature: 80° C.

The impact resistance was evaluated by measuring the Izod impact strength (with a notch) according to the procedures specified in ASTM D 256.

The solvent resistance was evaluated by the naked eye after the test piece ($\frac{1}{2} \times \frac{1}{2} \times 2.5''$) had been immersed in benzene at 23° C. for 1 h.

| | 実施例1 | 実施例2 | 比較例1 | 実施例3 | 実施例4 | 比較例2 | 実施例5 | 比較例3 |
|---|---|---|---|---|---|---|---|---|
| ポリフェニレンエーテル | 50 | 20 | 60 | 30 | 10 | 40 | 20 | 40 |
| 変性処理したポリフェニレンエーテル | 10 | 40 | | 10 | 30 | | 20 | |
| ポリアミド | 40 | 40 | 40 | 60 | 60 | 60 | 50 | 50 |
| S E B S | | | | | | | 10 | 10 |
| アイゾット (kg·cm/cm) | 4.7 | 7.2 | 1.6 | 5.1 | 7.5 | 2.2 | 28.9 | 2.8 |
| 耐溶剤性 | 良 | 良 | 良 | 良 | 良 | 良 | 良 | 良 |

Key to previous table:
(1) Application Example
(2) Comparative Example
(3) Polyphenylene ether
(4) Modified polyphenylene ether
(5) Polyamide
(6) Izod impact strength
(7) Solvent resistance
(8) Excellent As the foregoing explanations demonstrate, it is obvious that the impact resistance of the molded product derived from the resin composition of the present invention is significantly improved, and at the same time, an excellent solvent resistance is attained.

I claim:
1. A thermoplastic composition comprising:
   a) about 5% to about 90% by weight polyphenylene ether resin, wherein at least 1% by weight of the resin is modified by terminal oxazolinization; and
   b) about 95% to about 10% by weight polyamide resin;
   wherein the modification is achieved by thermally reacting the polyphenylene ether with at least one oxazolinization compound of the formula

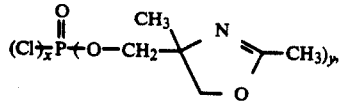

wherein x is 1 or 2; and the sum of x+y=3 or a compound which contains at least one halogenated acyl group and an oxazolinyl group within a single molecule.

2. The composition of claim 1, wherein the polyphenylene ether is selected from the group consisting of poly(2,6-dimethyl-1,4-phenylene) ether; poly (2,6-diethyl-1,4-phenylene) ether; poly (2-methyl-6-ethyl-1,4-phenylene) ether; poly(2-methyl-6-propyl-1,4phenylene) ether; poly (2,6-dipropyl-1,4-phenylene) ether; and poly (2-ethyl-6-propyl-1,4-phenylene) ether.

3. The composition of claim 1, wherein the polyphenylene ether is a copolymer.

4. The composition of claim 3, wherein the copolymer is formed from units of 2,6-dimethyl phenol and 2,3,6-trimethylphenol.

5. The composition of claim 1, wherein oxazolinization is carried out by introducing a substituted or unsubstituted oxazolinyl group to the terminal portion of the polyphenylene ether polymer.

6. The composition of claim 1, wherein a mixture of the oxazolinization compounds is utilized, representing x values of 1 and 2.

7. The composition of claim 1, wherein oxazolinization is carried out by the use of a compound which contains halogenated groups of phosphorus atoms and an oxazolinyl group within a single molecule.

8. The composition of claim 1, wherein the polyamide resin is selected from the group consisting of "Nylon" 6; "Nylon" 6,6; "Nylon" 6,10; "Nylon" 6,12; "Nylon" 11; "Nylon" 12; and copolymerized or condensed polyamides consisting principally of any of the aforementioned "Nylon" compounds.

9. The composition of claim 1, wherein the relative quantity of polyphenylene ether resin ranges from about 20%-80% by weight; and the relative quantity of polyamide resin ranges from about 80%-20% by weight.

10. The composition of claim 1, further comprising at least one resin selected from the group consisting of styrene resins and styrenic elastomeric copolymers.

11. The composition of claim 10, wherein the styrenic elastomeric copolymer is selected from the group consisting of styrene/ethylene-propylene copolymers; styrene/ethylene-butylene copolymers; styrene/butadiene copolymers, and other elastomers which are miscible with the polyamide resin.

12. The composition of claim 1, further comprising at least one component selected from the group consisting of fillers and flame retardants.

* * * * *